US009749477B2

(12) United States Patent
Chandramouli et al.

(10) Patent No.: US 9,749,477 B2
(45) Date of Patent: Aug. 29, 2017

(54) SOLUTION TO ENFORCE TIME AND USAGE THRESHOLD FOR MONITORING

(71) Applicant: NOKIA SOLUTIONS AND NETWORKS OY, Espoo (FI)

(72) Inventors: Devaki Chandramouli, Plano, TX (US); Martin Oettl, Weilheim (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 37 days.

(21) Appl. No.: 14/761,829

(22) PCT Filed: Jan. 18, 2013

(86) PCT No.: PCT/US2013/022154
§ 371 (c)(1),
(2) Date: Jul. 17, 2015

(87) PCT Pub. No.: WO2014/113019
PCT Pub. Date: Jul. 24, 2014

(65) Prior Publication Data
US 2015/0341503 A1 Nov. 26, 2015

(51) Int. Cl.
*H04M 1/00* (2006.01)
*H04M 15/00* (2006.01)
*H04L 12/14* (2006.01)

(52) U.S. Cl.
CPC .... *H04M 15/7652* (2013.01); *H04L 12/1407* (2013.01); *H04L 12/1435* (2013.01);
(Continued)

(58) Field of Classification Search
USPC .......... 455/405, 410, 404.1; 726/1; 370/328
See application file for complete search history.

(56) References Cited

U.S. PATENT DOCUMENTS 9,124,436 B2 *  9/2015  Kashanian .......... H04L 12/1417
2002/0049675 A1  4/2002  Kailamaki et al.
(Continued)

FOREIGN PATENT DOCUMENTS

WO    2011/147466 A1    12/2011

OTHER PUBLICATIONS

3GPP TR 21.905 V11.3.0 (Dec. 2012); 3rd Generation Partnership Project; Technical Specification Group Services and System Aspects; Vocabulary for 3GPP Specifications (Release 11).
(Continued)

*Primary Examiner* — David Q Nguyen
(74) *Attorney, Agent, or Firm* — Squire Patton Boggs (US) LLP

(57) ABSTRACT

Methods, apparatuses, and computer program products for enforcing time and usage limits are provided. One method includes allocating a usage allowance and time allowance for a group subscription to a network, and receiving a notification when a minimum threshold is reached for either the usage allowance or the time allowance within a certain duration. The method may further include determining a remainder of the usage allowance and a remainder of the time allowance by querying at least one policy and charging enforcement function, and reallocating the usage allowance and the time allowance based on the determined remainder of the usage allowance and the determined remainder of the time allowance.

24 Claims, 5 Drawing Sheets

(52) U.S. Cl.
CPC ........ *H04L 12/1439* (2013.01); *H04M 15/58* (2013.01); *H04M 15/59* (2013.01); *H04M 15/852* (2013.01)

(56) References Cited

U.S. PATENT DOCUMENTS

| | | |
|---|---|---|
| 2008/0077992 A1 | 3/2008 | Lee et al. |
| 2010/0029244 A1* | 2/2010 | Moodbidri ............. H04W 4/22 455/404.1 |
| 2010/0180319 A1 | 7/2010 | Hu et al. |
| 2010/0273445 A1* | 10/2010 | Dunn ...................... H04W 4/22 455/404.1 |
| 2012/0224538 A1 | 9/2012 | Stenfelt et al. |
| 2014/0187199 A1* | 7/2014 | Yan ....................... H04W 48/02 455/410 |

OTHER PUBLICATIONS

3GPP TR 23.858 V0.6.1 (Aug. 2012); 3rd Generation Partnership Project; Technical Specification Group Services and System Aspects; Usage Monitoring Control PCC Enhancement; (Release 12).

3GPP TS 23.203 V11.8.0 (Dec. 2012); 3rd Generation Partnership Project; Technical Specification Group Services and System Aspects; Policy and charging control architecture (Release 11).

\* cited by examiner

SOLUTION TO ENFORCE TIME AND USAGE THRESHOLD FOR MONITORING

BACKGROUND

Field

Embodiments of the invention relate to wireless communications networks, such as the Universal Mobile Telecommunications System (UMTS) Terrestrial Radio Access Network (UTRAN) Long Term Evolution (LTE) and Evolved UTRAN (E-UTRAN). Some embodiments relate to policy and charging control in such networks.

Description of the Related Art

A key component of communications networks, such as a LTE network, is the policy and charging control (PCC) function that provides and enhances capabilities of delivering dynamic control of policy and charging on a per subscriber and per internet protocol (IP) flow basis. The PCC architecture can provide support for fine-grained QoS and enable application servers to dynamically control the QoS and charging requirements of the services they deliver. Dynamic control over QoS and charging can assist mobile operators in providing customers with a variety of QoS and charging options when choosing a service.

This may be especially important with the increase in the use of smart phones and applications offering online video services (i.e., online streaming) Due to the proliferation of smart phones there has been a surge in data traffic flowing through mobile networks. Furthermore, since mobile operators do not have much control over the data generated by the applications running in the devices and there is currently no standard followed by application developers, there has been a constant increase in data traffic within mobile data network. This has caused significant concern for mobile operators today.

SUMMARY

One embodiment is directed to a method including allocating, by a PCRF, a usage allowance and time allowance for a group subscription to a network. The method may also include receiving a notification when a minimum threshold is reached for either the usage allowance or the time allowance within a certain duration, and determining a remainder of the usage allowance and a remainder of the time allowance by querying at least one policy and charging enforcement function. The method may then include reallocating the usage allowance and the time allowance based on the determined remainder of the usage allowance and the determined remainder of the time allowance.

Another embodiment includes an apparatus. The apparatus includes at least one processor, and at least one memory including computer program code. The at least one memory and computer program code, with the at least one processor, cause the apparatus at least to allocate a usage allowance and time allowance for a group subscription to a network, to receive a notification when a minimum threshold is reached for either the usage allowance or the time allowance within a certain duration, to determine a remainder of the usage allowance and a remainder of the time allowance by querying at least one policy and charging enforcement function, and to reallocate the usage allowance and the time allowance based on the determined remainder of the usage allowance and the determined remainder of the time allowance.

Another embodiment is directed to a computer program embodied on a computer readable medium. The computer program is configured to control a processor to perform a process. The process includes allocating a usage allowance and time allowance for a group subscription to a network. The process may also include receiving a notification when a minimum threshold is reached for either the usage allowance or the time allowance within a certain duration, and determining a remainder of the usage allowance and a remainder of the time allowance by querying at least one policy and charging enforcement function. The process may then include reallocating the usage allowance and the time allowance based on the determined remainder of the usage allowance and the determined remainder of the time allowance.

Another embodiment is directed to an apparatus including means for allocating a usage allowance and time allowance for a group subscription to a network. The apparatus may also include means for receiving a notification when a minimum threshold is reached for either the usage allowance or the time allowance within a certain duration, and means for determining a remainder of the usage allowance and a remainder of the time allowance. The means for determining may include mans for querying at least one policy and charging enforcement function. The apparatus may also include means for reallocating the usage allowance and the time allowance based on the determined remainder of the usage allowance and the determined remainder of the time allowance.

Another embodiment is directed to a method including receiving an allocation of a usage limit and time limit for a group subscription to the network. The method may also include sending a notification when a minimum threshold is reached for either the usage limit or the time limit within a certain duration. The method may include receiving a threshold query and sending a threshold report including an indication of a remainder of the usage limit and a remainder of the time limit. The method may also include receiving a reallocation of the usage limit and the time limit based on the determined remainder of the usage limit and the determined remainder of the time limit.

Another embodiment includes an apparatus. The apparatus includes at least one processor, and at least one memory including computer program code. The at least one memory and computer program code, with the at least one processor, cause the apparatus at least to receive an allocation of a usage limit and time limit for a group subscription to the network, to send a notification when a minimum threshold is reached for either the usage limit or the time limit within a certain duration, to receive a threshold query and send a threshold report including an indication of a remainder of the usage limit and a remainder of the time limit, and to receive a reallocation of the usage limit and the time limit based on the determined remainder of the usage limit and the determined remainder of the time limit.

Another embodiment is directed to a computer program embodied on a computer readable medium. The computer program is configured to control a processor to perform a process. The process includes receiving an allocation of a usage limit and time limit for a group subscription to the network. The process may also include sending a notification when a minimum threshold is reached for either the usage limit or the time limit within a certain duration. The process may include receiving a threshold query and sending a threshold report including an indication of a remainder of the usage limit and a remainder of the time limit. The process may also include receiving a reallocation of the usage limit and the time limit based on the determined remainder of the usage limit and the determined remainder of the time limit.

Another embodiment is directed to an apparatus including means for receiving an allocation of a usage limit and time limit for a group subscription to the network. The apparatus may also include means for sending a notification when a minimum threshold is reached for either the usage limit or the time limit within a certain duration. The apparatus may include means for receiving a threshold query and sending a threshold report including an indication of a remainder of the usage limit and a remainder of the time limit. The apparatus may also include means for receiving a reallocation of the usage limit and the time limit based on the determined remainder of the usage limit and the determined remainder of the time limit.

BRIEF DESCRIPTION OF THE DRAWINGS

For proper understanding of the invention, reference should be made to the accompanying drawings, wherein.

DETAILED DESCRIPTION

It will be readily understood that the components of the invention, as generally described and illustrated in the figures herein, may be arranged and designed in a wide variety of different configurations. Thus, the following detailed description of embodiments of systems, methods, apparatuses, and computer program products for enforcing time and usage limits, as represented in the attached figures, is not intended to limit the scope of the invention, but is merely representative of selected embodiments of the invention.

If desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

Operators have been moving away from flat rate subscription for data services to subscription based on data usage. In addition, family plans and sharing data amongst group of users are becoming more popular. So far, operators enforce either data usage (e.g., usage limit per month) or time allowance (e.g., subscription for certain duration per month). Accordingly, thresholds for time based and amount based monitoring, and related systems reactions if one threshold has been reached, are fairly independent. Currently, both thresholds are not combined. Therefore, according to current solutions, either the time threshold is reached or the volume threshold is reached and the system reacts independently for both monitoring types.

Certain embodiments of the invention introduce a new form of enforcement combining both time and usage thresholds and describes the functional behavior of the PCC framework, as will be discussed in detail below.

The PCC architecture extends the architecture of an internet protocol-connectivity access network (IP-CAN), where the Policy and Charging Enforcement Function (PCRF) is a functional entity in the gateway node implementing the IP access to the packet data network (PDN).

Figure 1:
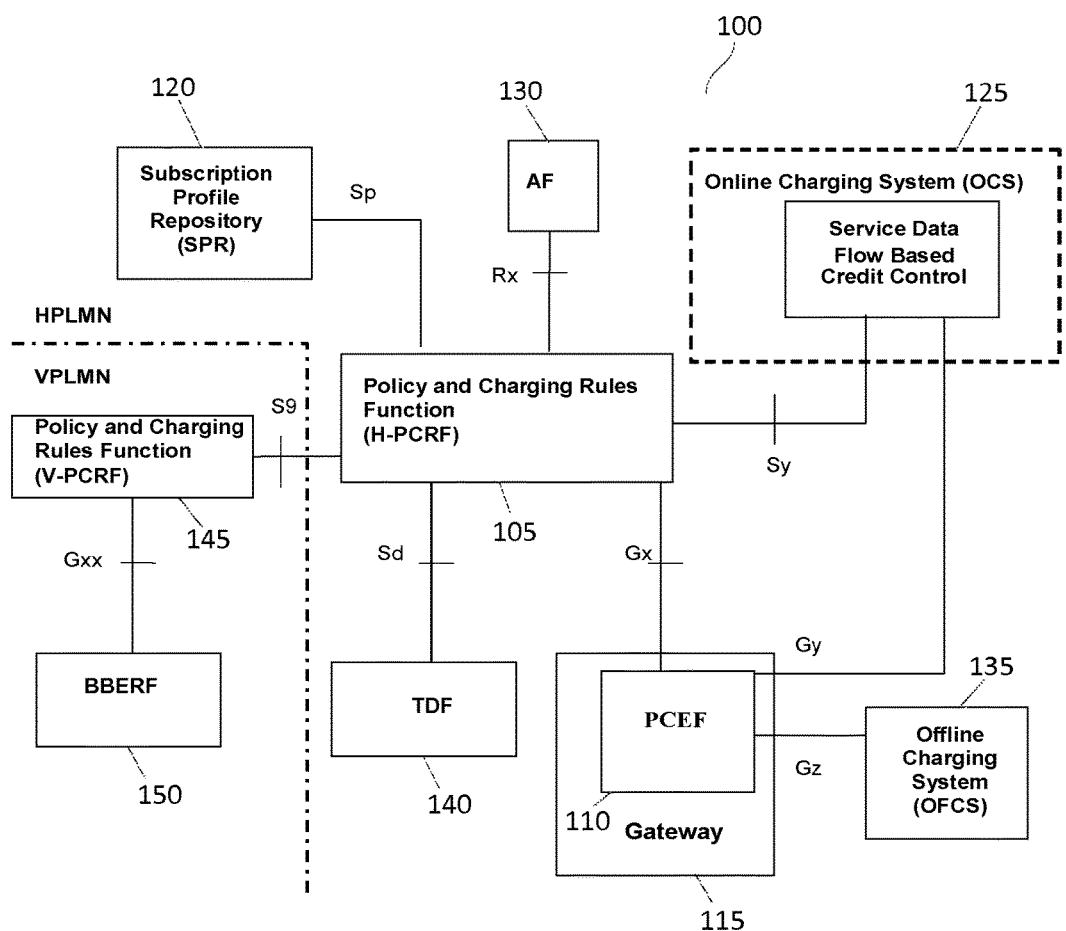
FIG. 1 illustrates a system according to one embodiment.

FIG. 1 illustrates an example of an overall PCC architecture 100, according to an embodiment. In particular, FIG. 1 depicts a PCC architecture 100 showing roaming with home routed access when a subscription profile repository (SPR) 120 is used. The PCC architecture 100 includes a home policy and charging rules function (H-PCRF) 105 in the Home Public Land Mobile Network (HPLMN). The H-PCRF 105 provides policy control and flow based charging control decisions.

A policy and charging enforcement function (PCEF) 110, which is implemented in the serving gateway 115, enforces gating and QoS for individual IP flows on the behalf of the PCRF 105. The PCEF 110 may also provide usage measurement to support charging. An online charging system (OCS) 125 provides credit management and grants credit to the PCEF 110 based on time, traffic volume, or chargeable events. The OCS 125 may include a functional entity called service data flow based credit control which performs online credit control function. The PCEF 110 interacts with OCS 125 to check credit and report credit status over the Gy interface, for example. An off-line charging system (OFCS) 135 receives events from the PCEF 110 over the Gz interface and generates charging data records (CDRs) for the billing system.

The SPR 120 contains subscriber/subscription information. The Sp interface resides between the SPR 120 and H-PCRF 105, and allows the H-PCRF 105 to request subscription information related to a subscriber's service/session. The H-PCRF 105 may ensure that the PCEF 110 user plane traffic mapping and treatment is in accordance with the user's subscription profile received from SPR 120 over the Sp interface.

The Application Function (AF) 130 interacts with applications or services that require dynamic PCC. The AF 130 extracts session information from the application signaling and provides it to the H-PCRF 105 over the Rx interface. The H-PCRF 105 may reject the request received from the AF when the service information is not consistent with subscription information.

In an embodiment, PCC architecture 100 may include a visited PCRF (V-PCRF) 145 in the Visited Public Land Mobile Network (VPLMN). The V-PCRF 145 may communicate with the H-PCRF 105 over the S9 interface, and with a bearer binding and event reporting function (BBERF) 150 over the Gxx interface.

As mentioned above, certain embodiments provide a new subscription option that operators can enforce for their subscribers. In addition, some embodiments provide a solution for performing the monitoring and coordination amongst different PCEF(s) to enforce both the usage and time limit set for a certain group of subscribers.

An embodiment of the invention will be described using an example where a family of 5 persons is subscribed for 10 GB data usage per month, and with a 200 hour time allowance per month. Of course, other embodiments of the invention can be applied to a group including any number of people and according to any usage and/or time threshold. Accordingly, embodiments of the invention are not limited to the specific threshold levels or number of users described in this example. In this example, the policy is enforced if the family exceeds 10 GB data before the end of the month. The policy is also enforced if the family exceeds the 200 hour time allowance before the end of the month. Otherwise, the PCEF(s) simply indicates the usage at the end of the month and the PCRF will provide new thresholds (time and volume) again when the next month or billing cycle starts.

According to an embodiment, a subscription policy is configured within the SPR and/or home subscription server (HSS) per user or per group subscription to enforce both time limit and usage threshold for a certain duration (e.g., 10 GB data limit, 200 hour time allowance per month). Since the users may be connected to different PCEF(s), the PCRF may perform the coordination amongst the different PCEF(s) where the users within a group are connected at any time. Furthermore, the PCRF can take into account that users within a group may connect to new PCEF(s) and all users within the group may leave a certain PCEF. The PCRF can also decide to hold some unallocated usage threshold and time allowance that is available for allocation to PCEF(s) when thresholds are exceeded and for new PCEF(s).

Certain embodiments of the invention provide at least two possible alternatives to accomplish enforcement of both a time threshold and a usage threshold. In one alternative, the PCRF divides the time allowance (T) and usage allowance (U) for a certain duration or period (P) equally amongst different PCEF(s) where the users within the group are connected at any point in time. According to this alternative, the PCRF will then register with the PCEF to report when a certain minimum threshold (Umin, Tmin) is reached within a certain duration (P) (e.g., a month). If this threshold is not reached, then the PCEF may simply report to the PCRF the remaining time and usage allowance at the end of the duration (Urem, Trem).

According to a second alternative, the PCRF allocates a time allowance (T) and usage allowance (U) for a certain duration or period (P) amongst different PCEF(s) depending on the number of users within the group connected to the given PCEF at any point in time. Therefore, in this alternative, the PCRF usage and time allowance (U, T) is allocated amongst different PCEF(s) depending on the number of users within the group connected at any point in time and the PCRF may also allocate based on user behavior (e.g., heavy data user). The PCRF will then register with the PCEF to report when a certain minimum threshold (Umin, Tmin) is reached within a certain duration (P) (e.g., month). If this threshold is not reached, then the PCEF may simply report to the PCRF the remaining allowance at the end of the duration P (Urem, Trem).

Figure 2:
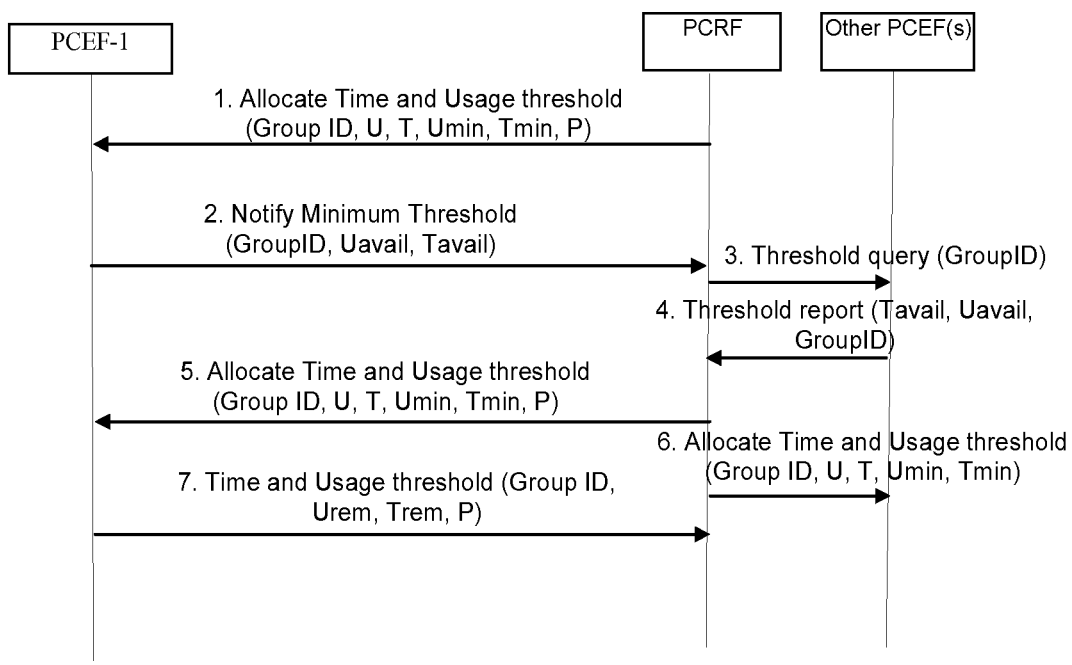
FIG. 2 illustrates a signaling diagram according to an embodiment.

According to certain embodiments, it may be important to define a Tmin, Umin to ensure strict enforcement because user plane traffic is ongoing in the PCEF, and the PCEF cannot be sure that the group of users has exceeded the time and usage threshold for the whole group. When the PCRF is in the process of determining this, the PCEF may need some allowance to serve the users and this can be accomplished by carefully defining Tmin and Umin FIG. 2 illustrates an example of a signaling diagram depicting a monitoring procedure, according to one embodiment of the invention. In FIG. 2, U refers to the usage threshold allocated by the PCRF, T refers to the time allowance allocated by the PCRF, Tmin refers to the minimum time allowance required by the PCEF for ongoing user plane traffic, and Umin refers to the minimum usage allowance required by the PCEF for ongoing user plane traffic.

As illustrated in FIG. 2, at 1, the PCRF allocates a usage allowance and time allowance (based on either of the two alternatives discussed above) at the beginning of the duration P (e.g., day 1 of the billing cycle) or when users within a certain group enter a certain PCEF. The PCRF registers itself with the PCEF for reporting when a minimum threshold is reached either for the usage allowance (Umin) or time allowance (Tmin) within a certain time period (P). At 2, the PCEF reports to the PCRF when the usage allowance reaches the minimum threshold (Umin) or time allowance reaches the minimum threshold (Tmin) within the specified duration P. It is noted that Umin and Tmin may not be reached at the same time within the PCEF for a certain group of users.

Continuing with FIG. 2, at 3, the PCRF determines the remaining usage allowance and remaining time allowance for the group of devices by querying all the PCEF(s). When the PCEF(s) are queried for the remaining usage allowance and time allowance, the PCEFs provide, at 4, a threshold report including Uavail (i.e., Urem-Umin) and Tavail (i.e., Trem-Tmin) to the PCRF. Once the PCRF receives the remaining time allowance (Tavail) and remaining usage allowance (Uavail) from all the PCEF(s), the PCRF, at 5 and 6, redistributes or reallocates the time allowance and usage allowance amongst PCEF(s). Steps 1 to 4 may be repeated until both the usage allowance and time allowance are available for distribution by the PCRF or until the duration P has elapsed.

According to an embodiment, if users within the group exit a certain PCEF before the duration P, then the PCEF reports the remaining time allowance and remaining usage allowance (Trem, Urem) so that the PCRF can use this for re-allocation. If the duration P elapses at the PCEF, then the PCEF reports the remaining time allowance and remaining usage allowance (Trem, Urem) so that the PCRF can use this information to determine if the time allowance and/or usage allowance have been reached or not.

In one embodiment, if the duration P elapses before the usage allowance is reached or time allowance limit is reached for a group of users as determined by the PCRF, then this implies that the group of users has stayed within the subscribed limit(s) for the duration P. In this case, no enforcement action is needed for the group of users.

According to an embodiment, if the usage allowance or time allowance limit has been reached for the group of users before the duration P has elapsed as determined by the PCRF, then this implies that some enforcement action will be applied (e.g., applying modified charging rules after the subscribed limit has been reached or restricting services). Rules may be configured within the SPR and downloaded to the PCRF, and enforcement actions may be applied at the PCEF.

According to one embodiment, when users within the group enter the network and are establishing packet data network (PDN) connections or packet data protocol (PDP) contexts with new PCEF(s), the PCRF may allocate the usage allowance and time allowance that it holds or start this procedure at step 3 in FIG. 2, i.e., by querying the PCEF(s) for available usage allowance and available time allowance. Similarly, when users within the group are exiting a certain PCEF and it holds remaining time allowance or usage allowance, it may report this remaining allowance to the PCRF for re-allocation. As a result, the remaining allowance(s) may be reported either when all the users within a certain group are exiting a certain PCEF or at the end of duration P.

Figure 3A:
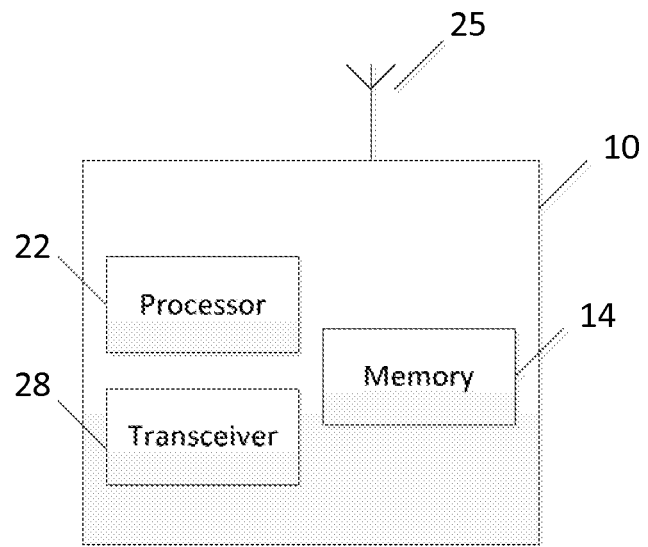
FIG. 3a illustrates an example of an apparatus according to one embodiment.

FIG. 3a illustrates an example of an apparatus 10 according to an embodiment. In one embodiment, apparatus 10 may be a PCRF as discussed above in connection with FIGS. 1 and 2. It should be noted that one of ordinary skill in the art would understand that apparatus 10 may include components or features not shown in FIG. 3a. Only those components or feature necessary for illustration of the invention are depicted in FIG. 3a.

As illustrated in FIG. 3a, apparatus 10 includes a processor 22 for processing information and executing instructions or operations. Processor 22 may be any type of general or specific purpose processor. While a single processor 22 is shown in FIG. 3a, multiple processors may be utilized according to other embodiments. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 further includes a memory 14, which may be coupled to processor 22, for storing information and instructions that may be executed by processor 22. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory (RAM), read only memory (ROM), static storage such as a magnetic or optical disk, or any other type of non-transitory machine or computer readable media. The instructions stored in memory 14 may include program instructions or computer program code that, when executed by processor 22, enable the apparatus 10 to perform tasks as described herein.

Apparatus 10 may also include one or more antennas 25 for transmitting and receiving signals and/or data to and from apparatus 10. Apparatus 10 may further include a transceiver 28 configured to transmit and receive information. For instance, transceiver 28 may be configured to modulate information on to a carrier waveform for transmission by the antenna(s) 25 and demodulates information received via the antenna(s) 25 for further processing by other elements of apparatus 10. In other embodiments, transceiver 28 may be capable of transmitting and receiving signals or data directly.

Processor 22 may perform functions associated with the operation of apparatus 10 including, without limitation, precoding of antenna gain/phase parameters, encoding and decoding of individual bits forming a communication message, formatting of information, and overall control of the apparatus 10, including processes related to management of communication resources.

In an embodiment, memory 14 stores software modules that provide functionality when executed by processor 22. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

As mentioned above, according to one embodiment, apparatus 10 may be a PCRF. In an embodiment, apparatus 10 may be controlled, by memory 14 and processor 22, to allocate a usage limit and time limit for a group subscription to a network, and to receive a notification when a minimum threshold is reached for either the usage limit or the time limit within a certain duration. Apparatus 10 may be further controlled, by memory 14 and processor 22, to determine a remainder of the usage limit and a remainder of the time limit by querying one or more PCEFs, and to reallocate the usage limit and the time limit based on the determined remainder of the usage limit and the determined remainder of the time limit.

In an embodiment, apparatus 10 may be controlled, by memory 14 and processor 22, to allocate the usage limit and the time limit for the group subscription at a beginning of the certain duration. In another embodiment, apparatus 10 may be controlled, by memory 14 and processor 22, to allocate the usage allowance and the time allowance for the group subscription when users within the group enter a certain policy and charging enforcement function.

According to one embodiment, apparatus 10 may be controlled, by memory 14 and processor 22, to allocate the usage allowance and the time allowance by dividing the usage allowance and the time allowance equally among different policy and charging enforcement functions to which users within the group are connected at any point in time during the certain duration. According to another embodiment, apparatus 10 may be controlled, by memory 14 and processor 22, to allocate the usage allowance and the time allowance among different policy and charging enforcement functions depending on a number of users within the group connected to each of the policy and charging enforcement functions at any point in time during the certain duration.

In certain embodiments, apparatus 10 may be controlled, by memory 14 and processor 22, to repeat the allocating, receiving, and determining until the usage allowance and the time allowance are reached.

According to an embodiment, when users within the group exit the certain policy and charging enforcement function before an end of the certain duration, apparatus 10 may be further controlled, by memory 14 and processor 22, to receive a report of the remaining usage allowance and the remaining time allowance. In an embodiment, when an end of the certain duration is reached, apparatus 10 may be further controlled, by memory 14 and processor 22, to receive a report of the remaining usage allowance and the remaining time allowance.

According to one embodiment, when the usage allowance or the time allowance is reached before an end of the certain duration, apparatus 10 may be further controlled, by memory 14 and processor 22, to apply an enforcement action. In one embodiment, the enforcement action may include applying modified charging rules. In another embodiment, the enforcement action may include restricting services to users within the group.

Figure 3B:
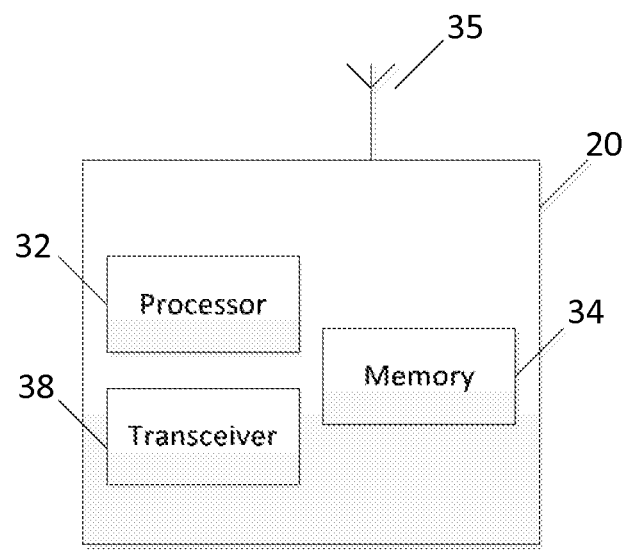
FIG. 3b illustrates an example of an apparatus according to another embodiment.

FIG. 3b illustrates an example of an apparatus 20 according to another embodiment. In an embodiment, apparatus 20 may be a PCEF as discussed above in connection with FIGS. 1 and 2. It should be noted that one of ordinary skill in the art would understand that apparatus 20 may include components or features not shown in FIG. 3b. Only those components or feature necessary for illustration of the invention are depicted in FIG. 3b.

As illustrated in FIG. 3b, apparatus 20 includes a processor 32 for processing information and executing instructions or operations. Processor 32 may be any type of general or specific purpose processor. While a single processor 32 is shown in FIG. 3b, multiple processors may be utilized according to other embodiments. In fact, processor 32 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 20 further includes a memory 34, which may be coupled to processor 32, for storing information and instructions that may be executed by processor 32. Memory 34 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 34 can be comprised of any combination of random access memory (RAM), read only memory (ROM), static storage such as a magnetic or optical disk, or any other type of non-transitory machine or computer readable media. The instructions stored in memory 34 may include program instructions or computer program code that, when executed by processor 32, enable the apparatus 20 to perform tasks as described herein.

Apparatus 20 may also include one or more antennas 35 for transmitting and receiving signals and/or data to and from apparatus 20. Apparatus 20 may further include a transceiver 38 configured to transmit and receive information. For instance, transceiver 38 may be configured to modulate information on to a carrier waveform for transmission by the antenna(s) 35 and demodulates information received via the antenna(s) 35 for further processing by other elements of apparatus 20. In other embodiments, transceiver 38 may be capable of transmitting and receiving signals or data directly.

Processor 32 may perform functions associated with the operation of apparatus 20 including, without limitation, precoding of antenna gain/phase parameters, encoding and decoding of individual bits forming a communication message, formatting of information, and overall control of the apparatus 20, including processes related to management of communication resources.

In an embodiment, memory 34 stores software modules that provide functionality when executed by processor 32. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

As mentioned above, according to one embodiment, apparatus 20 may be a PCEF. In this embodiment, apparatus 20 may be controlled by memory 34 and processor 32 to receive an allocation of a usage limit and time limit for a group subscription to the network, to send a notification when a minimum threshold is reached for either the usage limit or the time limit within a certain duration, to receive a threshold query and send a threshold report including an indication of a remainder of the usage allowance and a remainder of the time allowance, and to receive a reallocation of the usage allowance and the time allowance based on the determined remainder of the usage allowance and the determined remainder of the time allowance.

Figure 4:
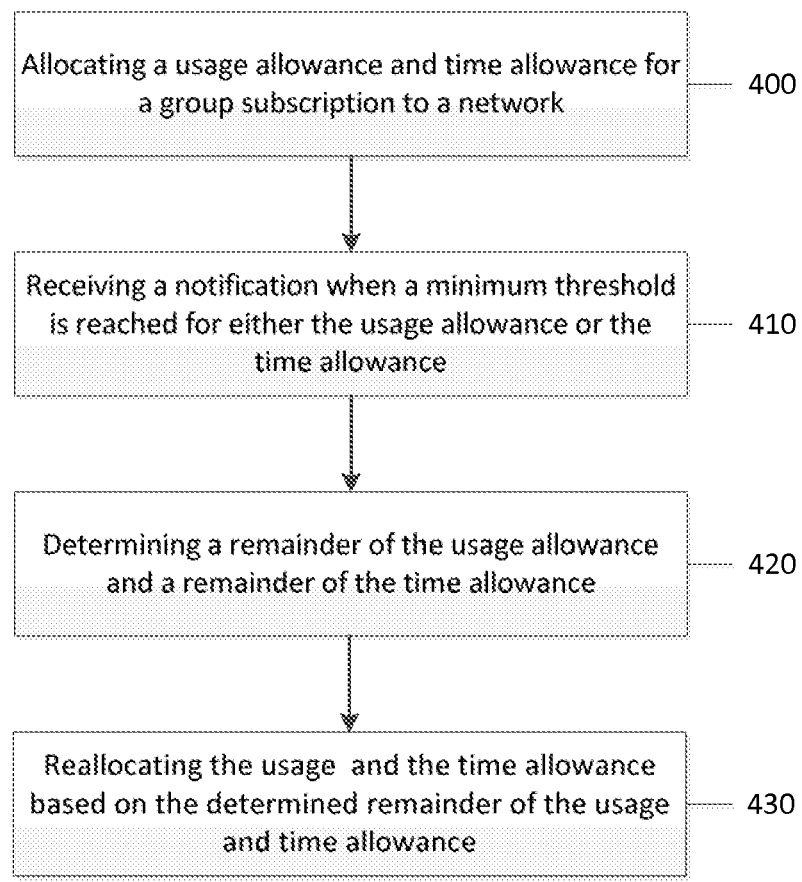
FIG. 4 illustrates a flow diagram of a method according to one embodiment.

FIG. 4 illustrates an example of a flow diagram of a method, according to one embodiment. The method may include, at 400, allocating a usage allowance and time allowance for a group subscription to a network. In one embodiment, the method may then include, at 410, receiving a notification when a minimum threshold is reached for either the usage allowance or the time allowance within a certain duration. The method may also include, at 420, determining a remainder of the usage allowance and a remainder of the time allowance by querying at least one policy and charging enforcement function. The method may then include, at 430, reallocating the usage allowance and the time allowance based on the determined remainder of the usage allowance and the determined remainder of the time allowance.

Figure 5:
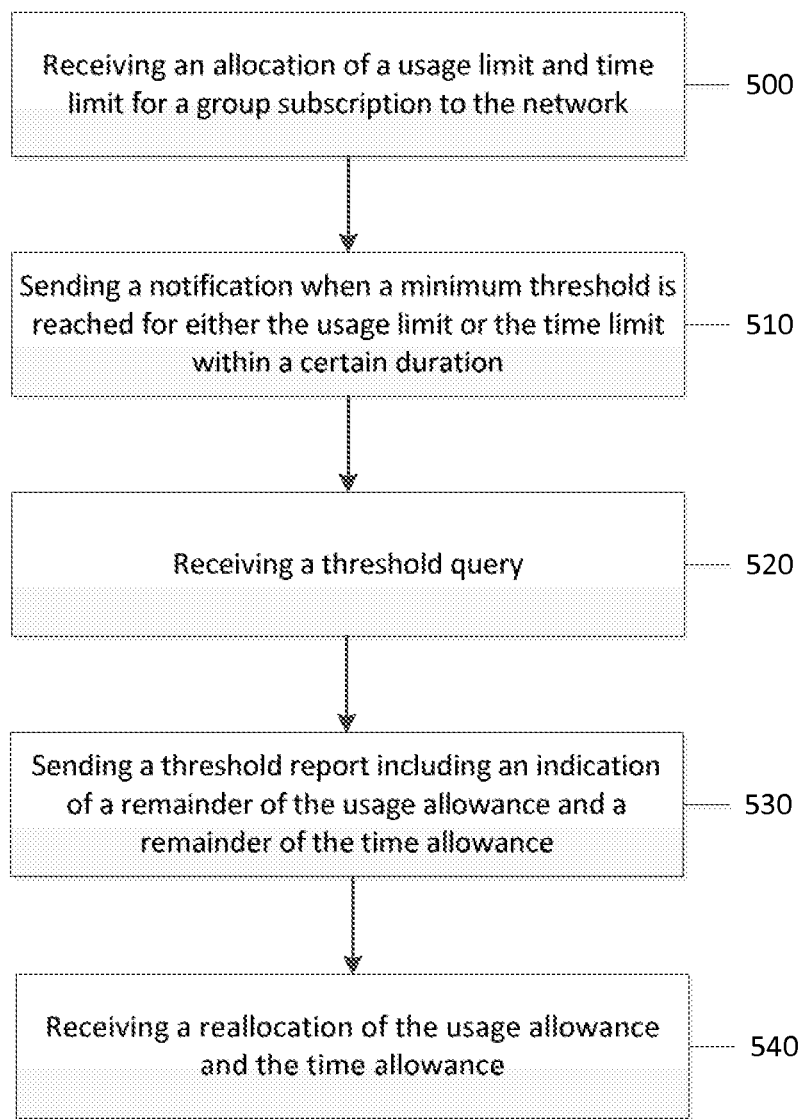
FIG. 5 illustrates a flow diagram of a method according to another embodiment.

FIG. 5 illustrates an example of a flow diagram of a method, according to another embodiment. The method may include, at 500, receiving an allocation of a usage limit and time limit for a group subscription to the network. The method may also include, at 510, sending a notification when a minimum threshold is reached for either the usage limit or the time limit within a certain duration. At 520, the method may include receiving a threshold query and, at 530, sending a threshold report including an indication of a remainder of the usage allowance and a remainder of the time allowance. The method may also include, at 540, receiving a reallocation of the usage allowance and the time allowance based on the determined remainder of the usage allowance and the determined remainder of the time allowance.

In some embodiments, the functionality of any of the methods described herein, such as those illustrated in FIGS. 4 and 5 discussed above, may be implemented by software and/or computer program code stored in memory or other computer readable or tangible media, and executed by a processor. In other embodiments, the functionality may be performed by hardware, for example through the use of an application specific integrated circuit (ASIC), a programmable gate array (PGA), a field programmable gate array (FPGA), or any other combination of hardware and software.

The described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method, comprising:

allocating a usage allowance and time allowance, the time allowance being the sum of time durations during which a network usage operation has taken place, for a group subscription to a network;

receiving a notification when a minimum threshold is reached for either the usage allowance or the time allowance within a certain duration;

determining a remainder of the usage allowance and a remainder of the time allowance by querying at least one policy and charging enforcement function; and reallocating the usage allowance and the time allowance based on the determined remainder of the usage allowance and the determined remainder of the time allowance.

2. The method according to claim 1, wherein the allocating comprises allocating the usage allowance and the time allowance for the group subscription at a beginning of the certain duration.

3. The method according to claim 1, wherein the allocating comprises allocating the usage allowance and the time allowance for the group subscription when users within the group enter a certain policy and charging enforcement function.

4. The method according to claim 1, wherein the allocating comprises dividing the usage allowance and the time allowance equally among different policy and charging enforcement functions to which users within the group are connected at any point in time during the certain duration.

5. The method according to claim 1, wherein the allocating comprises allocating the usage allowance and the time allowance among different policy and charging enforcement functions depending on a number of users within the group connected to each of the policy and charging enforcement functions at any point in time during the certain duration.

6. The method according to claim 1, further comprising repeating the steps of allocating, receiving, and determining until the usage allowance and the time allowance are reached.

7. The method according to claim 1, further comprising receiving a report of the remaining usage allowance and the remaining time allowance when users within the group exit the certain policy and charging enforcement function before an end of the certain duration.

8. The method according to claim 1, further comprising receiving a report of the remaining usage allowance and the remaining time allowance when an end of the certain duration is reached.

9. The method according to claim 1, further comprising applying an enforcement action when the usage allowance or the time allowance is reached before an end of the certain duration.

10. The method according to claim 9, wherein the applying of the enforcement action comprises applying modified charging rules.

11. The method according to claim 9, wherein the applying of the enforcement action comprises restricting services to users within the group.

12. An apparatus, comprising:
at least one processor; and
at least one memory comprising computer program code, the at least one memory and the computer program code configured, with the at least one processor, to cause the apparatus at least to
allocate a usage allowance and time allowance, the time allowance being the sum of durations during which a downloading operation has taken place, for a group subscription to a network;
receive a notification when a minimum threshold is reached for either the usage allowance or the time allowance within a certain duration;
determine a remainder of the usage allowance and a remainder of the time allowance by querying at least one policy and charging enforcement function; and
reallocate the usage allowance and the time allowance based on the determined remainder of the usage allowance and the determined remainder of the time allowance.

13. The apparatus according to claim 12, wherein the at least one memory and the computer program code are further configured, with the at least one processor, to cause the apparatus at least to allocate the usage allowance and the time allowance for the group subscription at a beginning of the certain duration.

14. The apparatus according to claim 12, wherein the at least one memory and the computer program code are further configured, with the at least one processor, to cause the apparatus at least to allocate the usage allowance and the time allowance for the group subscription when users within the group enter a certain policy and charging enforcement function.

15. The apparatus according to claim 12, wherein the at least one memory and the computer program code are further configured, with the at least one processor, to cause the apparatus at least to allocate the usage allowance and the time allowance by dividing the usage allowance and the time allowance equally among different policy and charging enforcement functions to which users within the group are connected at any point in time during the certain duration.

16. The apparatus according to claim 12, wherein the at least one memory and the computer program code are further configured, with the at least one processor, to cause the apparatus at least to allocate the usage allowance and the time allowance among different policy and charging enforcement functions depending on a number of users within the group connected to each of the policy and charging enforcement functions at any point in time during the certain duration.

17. The apparatus according to claim 12, wherein the at least one memory and the computer program code are further configured, with the at least one processor, to cause the apparatus at least to repeat the steps of allocating, receiving, and determining until the usage allowance and the time allowance are reached.

18. The apparatus according to claim 12, wherein the at least one memory and the computer program code are further configured, with the at least one processor, to cause the apparatus at least to receive a report of the remaining usage allowance and the remaining time allowance when users within the group exit the certain policy and charging enforcement function before an end of the certain duration.

19. The apparatus according to claim 12, wherein the at least one memory and the computer program code are further configured, with the at least one processor, to cause the apparatus at least to receive a report of the remaining usage allowance and the remaining time allowance when an end of the certain duration is reached.

20. The apparatus according to claim 12, wherein the at least one memory and the computer program code are further configured, with the at least one processor, to cause the apparatus at least to apply an enforcement action when the usage allowance or the time allowance is reached before an end of the certain duration.

21. The apparatus according to claim 20, wherein the at least one memory and the computer program code are further configured, with the at least one processor, to cause the apparatus at least to apply the enforcement action by applying modified charging rules.

22. The apparatus according to claim 20, wherein the at least one memory and the computer program code are further configured, with the at least one processor, to cause the apparatus at least to apply the enforcement action by restricting services to users within the group.

23. The apparatus according to claim 12, wherein the apparatus comprises a policy and charging enforcement function (PCRF).

24. A computer program, embodied on a non-transitory computer readable medium, wherein the computer program is configured to control a processor to perform a process, comprising:
- allocating a usage allowance and time allowance, the time allowance being the sum of durations during which a downloading operation has taken place, for a group subscription to a network;
- receiving a notification when a minimum threshold is reached for either the usage allowance or the time allowance within a certain duration;
- determining a remainder of the usage allowance and a remainder of the time allowance by querying at least one policy and charging enforcement function; and
- reallocating the usage allowance and the time allowance based on the determined remainder of the usage allowance and the determined remainder of the time allowance.

* * * * *